(12) United States Patent
Luce

(10) Patent No.: US 7,168,309 B2
(45) Date of Patent: Jan. 30, 2007

(54) LOOKING DEVICE FOR A HOUSING OF A TIRE PRESSURE DETECTOR

(75) Inventor: Dominique Luce, Mancioux (FR)

(73) Assignee: Siemens VDO Automotive, Toulouse Cedex 1 (FR)

( * ) Notice: Subject to any disclaimer, the term of this patent is extended or adjusted under 35 U.S.C. 154(b) by 0 days.

(21) Appl. No.: 11/199,269

(22) Filed: Aug. 9, 2005

(65) Prior Publication Data

US 2006/0032300 A1 Feb. 16, 2006

(30) Foreign Application Priority Data

Aug. 10, 2004 (FR) .................................. 04 08768

(51) Int. Cl.
*G01M 17/02* (2006.01)

(52) U.S. Cl. ...................................................... 73/146

(58) Field of Classification Search ..................... None
See application file for complete search history.

(56) References Cited

U.S. PATENT DOCUMENTS

| 4,723,445 | A | * | 2/1988 | Ripley et al. .............. 73/146.3 |
| 5,325,901 | A | * | 7/1994 | Olney et al. ................. 152/418 |
| 5,685,744 | A | * | 11/1997 | Blanchot et al. ............ 439/701 |

FOREIGN PATENT DOCUMENTS

FR 2 814 702 4/2002

* cited by examiner

*Primary Examiner*—Edward Lefkowitz
*Assistant Examiner*—Andre Alen
(74) *Attorney, Agent, or Firm*—Young & Thompson

(57) ABSTRACT

This locking device is adapted for a snap-in system in which a male portion of a first element coacts with a female portion of a second element, resilient members acting on the male and/or female portion of the snap-in system.

14 Claims, 2 Drawing Sheets

LOOKING DEVICE FOR A HOUSING OF A TIRE PRESSURE DETECTOR

FIELD OF THE INVENTION

The present invention relates to a locking device for a housing of a tire pressure detector.

BACKGROUND OF THE INVENTION

It is known to provide a tire, particularly of passenger car or heavy vehicle, with a pressure detector so as to know the pressure prevailing within this tire without having to attach an external pressure sensor to the valve with which the tire is generally provided. Such sensors are used in surveillance systems for pressure of tires on certain vehicles. Such a system is known to those in the art is thus not described in detail here.

An automotive vehicle tire is conventionally mounted on a rim and a valve permits the introduction of air under pressure to inflate the tire (or if desired to let air escape from the tire). When such a tire is provided with a pressure sensor, the latter is generally fixed on the rim at the valve. However, it is also possible to place such a detector at the base of the rim. This position is in certain cases not treated here, preferable to the conventional solution of mounting on the valve.

The present invention relates more particularly to pressure detectors fixed at the base of the rim. To achieve this securement, a support is fixed (for example by cementing or by mechanical means) at the base of the rim and will carry an electronic housing comprising the pressure detector. The support thus comprises on the one hand a hook and on the other hand snap-in means.

The hook of the support is oriented such that its cavity is located on the side of the base of the rim. A housing for the pressure sensor comprises itself an axle coming into engagement with this hook. Thanks to the orientation of the hook, when the wheel turns, the hook forms an abutment for the housing of the pressure detector and thus guarantees good support of this latter.

On the side of the housing opposite the side carrying the axle, the housing of the pressure detector comprises snap-in means complementary to those of the support.

Given the large forces and vibrations to which the pressure sensor housings are subjected, it is desirable to guarantee excellent gripping of the housing on the support to guarantee holding the sensor in place. In one embodiment, the support has a tongue in which is provided a substantially rectangular slot. Upon snapping the housing onto the support, the tongue passes through an opening provided in the housing and at the level of which is located a projection. This latter thus will be elastically introduced into the slot provided in the tongue of the support. The form of the projection is optimized to facilitate on the one hand the introduction of the projection into the slot (presence of an inclined plane) and to prevent the retraction of the projection from the slot (straight edge).

It is very difficult thus to obtain good gripping resistant to high mechanical stresses to which a pressure sensor is subjected. A substantial rejection of the parts is thus to be expected.

SUMMARY OF THE INVENTION

The current invention has for its object to provide means permitting effective snapping in of a pressure sensor housing on a corresponding support. Preferably, this device will be of low cost, permitting holding the pressure sensor at the base of the wheel rim even at high speeds and also resisting forces to which it is subjected during mounting and demounting the tire.

To this end, the invention provides a locking device for a snap-in system in which a male portion of a first element coacts with a female portion of a second element, resilient means acting on the male and/or female portion of the snap-in system. This locking device thus has for its object to hold the two portions of the snap-in system together and thereby to avoid freeing the two elements.

According to the invention, this locking device comprises:

a transverse bar,
two curved resilient arms whose concavity is directed toward the transverse bar and which are disposed in a same plane as the transverse bar such that the transverse bar provides an abutment limiting the movement of the resilient arms in the direction of the transverse bar, and
abutment means disposed substantially at the free end of each resilient arm, complementary abutment means being provided on one of the elements carrying the snap-in system.

Such a locking device guarantees good locking by snapping in. It is adapted to be introduced into the locking device, the introduction being carried out in the plane containing the resilient arms and the transverse arm in a direction perpendicular to the transverse arm. The resilient arms, to coact with the complementary abutment means, can come into abutment against the transverse bar which serves them as a guide in translation. The fact of having two resilient arms permits distributing the locking forces and is desirable to prevent retraction of the locking device. When such retraction tends to take place, the resilient arms brace themselves against the supplemental abutment means, preventing this movement.

In such a locking device, the transverse bar preferably carries on the side of the elastic arms, for each of the latter, an abutment disposed in the plane of these latter and limiting their path. In this way, the urging of the resilient arms is limited and there is no risk of involuntarily damaging them.

To provide the locking device with unlocking means, the free ends of the resilient arms are for example each provided with an opening. A tool, such as for example a circlip pliers, can then be used to free the abutment means of the resilient arms from the complementary abutment means.

To facilitate its introduction into a snap-in system, a locking device according to the invention preferably comprises guide means for longitudinal movement in the plane of the resilient arms and perpendicular to the transverse bar. Such a guidance is desirable to guarantee good positioning of the locking device in the corresponding snap-in system. The guide means comprise for example a rib extending perpendicular to the transverse bar between the two resilient arms. This embodiment is preferable, because the rib can also be used as a corrector. Thus, by adapting the dimensions of the rib, it can be provided that the locking device cannot penetrate the snap-in system for problems of size if the rib is not disposed in its corresponding groove.

The transverse bar preferably carries means forming an abutment, adapted to coact with the complementary means so as to prevent any movement in translation in a transverse direction in a plane containing the resilient arms. In such an arrangement, the locking device is perfectly held in place and an action on the latter in a longitudinal direction relative to the transverse bar is not retransmitted to the resilient arms which cannot withstand too great stress.

In a preferred embodiment, the locking device described above is made of a synthetic material loaded with fibers. The choice of such a material permits obtaining good resiliency in the resilient arms and permits the device to resist high mechanical stresses.

The present invention also relates to a snap-in system in which a male portion of a first element coacts with a female portion of a second element, resilient means acting on the male and/or female portion of the snap-in system, characterized in that one of the elements has a window and the other element has a tongue adapted to be introduced into the window to cause the male and female portions of the snap-in system to coact, and in that said snap-in system also comprises a locking device as described above, said locking device being adapted to be disposed in the window to prevent movement of the tongue.

Finally, the present invention also relates to an assembly comprising a pressure sensor mounted in an electronic housing as well as a support for said housing, characterized in that the electronic housing and its support have a system engaging each other by snapping in, and in that said assembly comprises moreover a locking device as described above.

BRIEF DESCRIPTION OF THE DRAWINGS

Details and advantages of the present invention will become further understood from the following description, given with reference to the accompanying schematic drawings, in which.

DETAILED DESCRIPTION OF THE INVENTION

Figure 1:
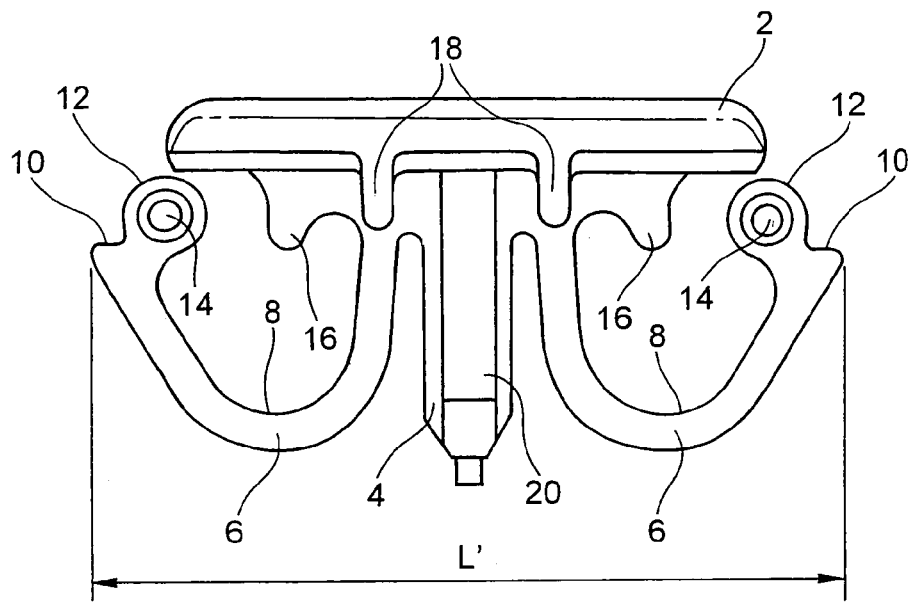
FIG. 1 is a front view of a locking device according to the invention.

FIG. 1 shows a locking device according to the invention. This device is substantially flat, certain elements being however projecting from one surface of this device.

The general shape of this locking device is that of a T having two resilient arms each in the form of a hook.

The locking device described herein can have numerous orientations in space when it locks an electronic housing of a pneumatic pressure sensor on a support receiving it. In what follows, it will be considered that the transverse bar of the T is horizontal and disposed at the top of the locking device whilst the central stem of the T is vertical and disposed below the horizontal bar of the T. The right/left references are given with respect to FIG. 1.

As set forth above, the locking device comprises an upper horizontal bar 2 and a foot 4 extending vertically. On each side of this foot 4 is disposed a resilient arm 6. Each resilient arm extends from the upper bar 2, adjacent the central foot 4 and descends along this foot 4 before curving back and rising again toward the upper bar 2. Thus, each resilient arm 6 has a concavity 8 oriented toward the upper bar 2.

The free end of each resilient arm 6 has an engagement surface 10 that is substantially horizontal (and hence parallel to the upper bar 2). Moreover, each free end of a resilient arm 6 carries an ear 12 at the center of which is located a hole 14.

The locking device is designed such that, when a force is exerted on a resilient arm 6 upwardly, which is to say in the direction of the upper bar 2, then this latter serves as an abutment to the upward movement of the resilient arm 6 and guides the latter in the direction of the central foot 4. In the embodiment shown in the drawings, the corresponding ear 12 takes part in this abutment and gives horizontal guidance.

To avoid too great a stress on the resilient arms as well as any plastic deformation of these, an abutment 6 is provided below the upper bar 2.

All the elements described above are disposed substantially in a same plane. The locking device also comprises several elements that are located in a plane parallel to the plane of the sheet and located for example in front of this latter. These are lugs 18 and a rib 20. The transverse bar 2 itself, in the illustrated embodiment, has a double thickness and extends into the two mentioned planes.

The lugs 18 are disposed just below the upper bar 2. There is shown in the embodiment illustrated in the drawings, a lug 18 on each side of the central foot 4. The shape and position on the transverse bar 2 of these tenons are such as to be able to resist lateral forces of mounting a tire.

The rib 20 extends over all the height of the central foot 4. It has a width less than that of this central foot. This rib 20 is adapted for the vertical guidance of the central foot 4 as well as all the locking device.

Figure 2:
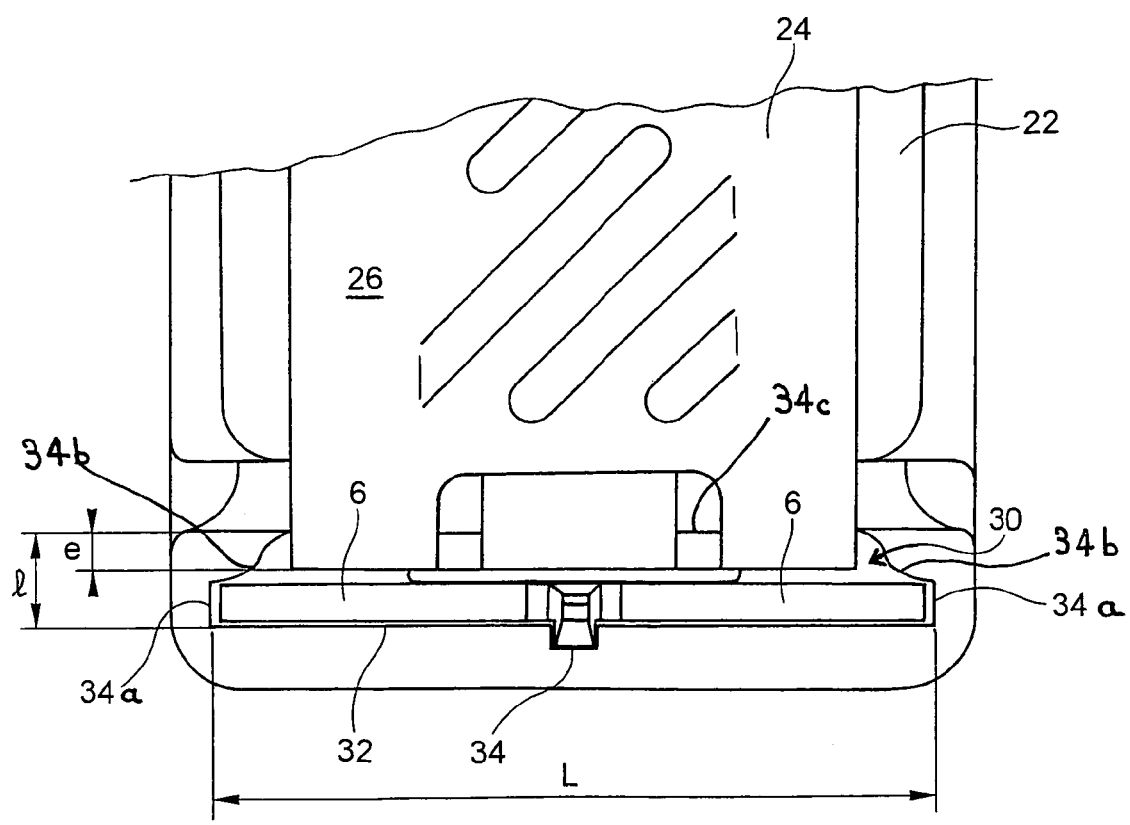
FIG. 2 is a bottom plan view of the device of FIG. 1 in place on a support and an electronic housing.

FIG. 2 shows the locking device in a view from below. This device, in this figure, locks an electronic housing 22 on a support 24. As can be seen from FIGS. 3 and 4, this support 24 comprises a base 26 adapted to be positioned at the base of a wheel rim and matching the curve of this latter, as well as two tongues 28 extending substantially perpendicular to the base 26.

The electronic housing is fixed on the support 24. One of the tongues 28 has a hook (not shown) adapted to receive an axle secured to the electronic housing 22. The present invention is adapted to lock the other tongue 28 of the support 24 when it coacts with the electronic housing 22. This tongue 28 is provided with snap-in means adapted to coact with the complementary snap-in means provided on the electronic housing 22.

The electronic housing 22 comprises particularly a pressure sensor as well as an emitter permitting transmitting to a central unit the pressure measurements that have been carried out.

As to the securement of this electronic housing 22 on the support 24 at the tongue 28 carrying the snap-in means, the electronic housing 22 comprises a window 30 in which are located snap-in means complementary to those of the corresponding tongue 28. As is clearly seen in FIG. 2, this window 30 is delimited by its front edge 32, to lateral edges 34a, two connecting edges 34b and a rear edge 34c.

It can be provided that the tongue 28 has a slot (not shown) adapted to receive a projection (not shown) provided in the window 30. There can also be provided a slot or a groove, in the electronic housing 22 at the window 30 and a projection adapted to coact with the slot or the groove made in the electronic housing 22.

In the embodiment shown in the drawings, the tongue 28 carrying the snap-in means is a single tongue. A cutout is provided at the junction of the tongue 28 and the base 26 to permit better resiliency of the tongue 28 and if desired also used for the securement of the support 24 on the corresponding wheel rim. The upper portion of the tongue 28 is not visible in the drawing, on which there will be seen only two tongues of the tongue 28 connecting this latter to the base 26. An abutment 42 is provided adjacent each cutout in the support 24 between its base 26 and the tongues 28 to limit the path of the electronic housing 22.

To carry out the locking of the electronic housing 22 on the support 24, the electronic housing is pivoted about its axis on the first tongue 28 of the support 24, such that the tongue 28 carrying the snap-in means will enter the window 30. The snap-in means thus coact with the complementary snap-in means to ensure the engagement of the electronic housing 22 on the support 24.

In a conventional way, the snapping in is carried out by resilient movement of a piece, in the present case the tongue 28. Because of this, the window 30 has a width l greater than the thickness e of the tongue 28. The support 24 is adapted for use on wheel rims of different diameters. For two wheel rims of different diameter, when the electronic housing 22 pivots to snap onto the tongue 28 provided with snap-in means, the angle of approach of the window 30 relative to this tongue varies. There should also be for this reason a window 30 of a width l greater than the width e of the tongue 28 such that this tongue can be introduced during pivoting in the window 30.

The locking device can also be disposed in the window 30. It extends in this latter substantially parallel to the tongue 28. This locking device, once the snap-in means of the tongue 28 coact with the complementary snap-in means of the electronic housing 22, permit holding the tongue 28 and the electronic housing in a snapped-in position. This locking device prevents any play of the tongue 28 in the window 30.

Figure 3:
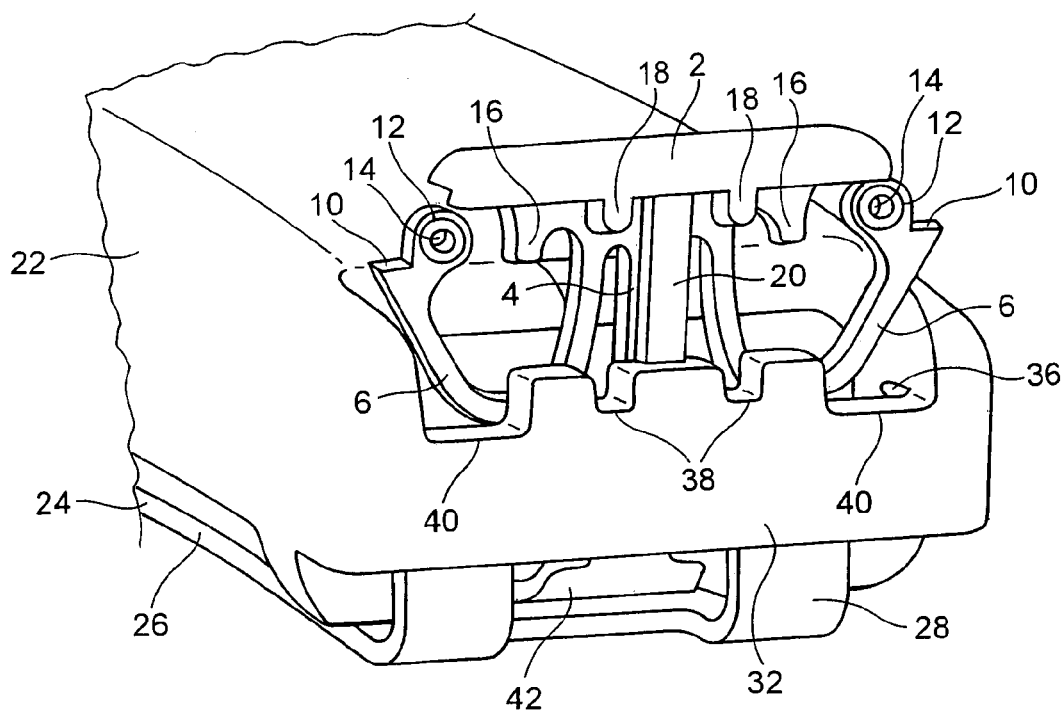
FIG. 3 is a perspective view showing the introduction of a locking device in said electronic housing, and FIG. 4 corresponds to FIG. 3, the locking device being entirely introduced into the housing.

FIG. 3 shows the introduction of the locking device into the window 30. In the described embodiment, the tongue 28 is introduced in one direction into the window 30 and the locking device is introduced in the opposite direction into this window 30. The edge 32 of the window 30, opposite the edge of this window bearing the complementary snap-in means, has a groove 34 extending longitudinally relative to the axis of the window 30. This groove 34 is of a shape complementary to the rib 20 of the central foot 4 of the locking device.

The coaction of the rib 20 with the groove 34 permits on the one hand the centering of the locking device in the window 30 and on the other hand the guidance of the locking device during its introduction in the window 30. Finally, these two elements 20 and 34 also provide an assurance device. Thus, it can be provided that the thickness of the rib 20 is such that the thickness of the locking device at this rib 20 is greater than the distance (l-e) which is to say the width l of the window 30 decreased by the thickness e of the tongue 28. In this case, if the locking device is presented reversed, which is to say pivoted 1800 relative to the longitudinal axis of the window 30, the locking device cannot enter the window 30, to the extent that the tongue 28 is already in place.

The length L (FIG. 2) of the window 30 is less than the length L' (FIG. 1) of the locking device. Thus, when the locking device enters the window 30, the free ends of the resilient arms 6 come against the lateral edges of the window 30. The resilient arms 6 are thus pressed toward the upper bar 2 of the locking device and toward the central foot 4 of this device. The guidance by the rib 20 in the groove 34 permits ensuring that the two resilient arms 6 are stressed to the same degree. The abutments 16 permit avoiding any excessive stressing of the resilient arms 6.

The window 30 also comprises two lateral edges 34a. Each of these latter has a notch 36 to receive the free end in the form of a hook of the corresponding resilient arm 6 and to coact with the engagement surface 10 of this resilient arm 6. When this engagement surface 10 arrives at the notch 36, the resilient arm 6 extends and moves slightly from the central foot 4. Parallel to this movement, the lugs 18 engage in the complementary recesses 38 adapted to receive them.

Figure 4:
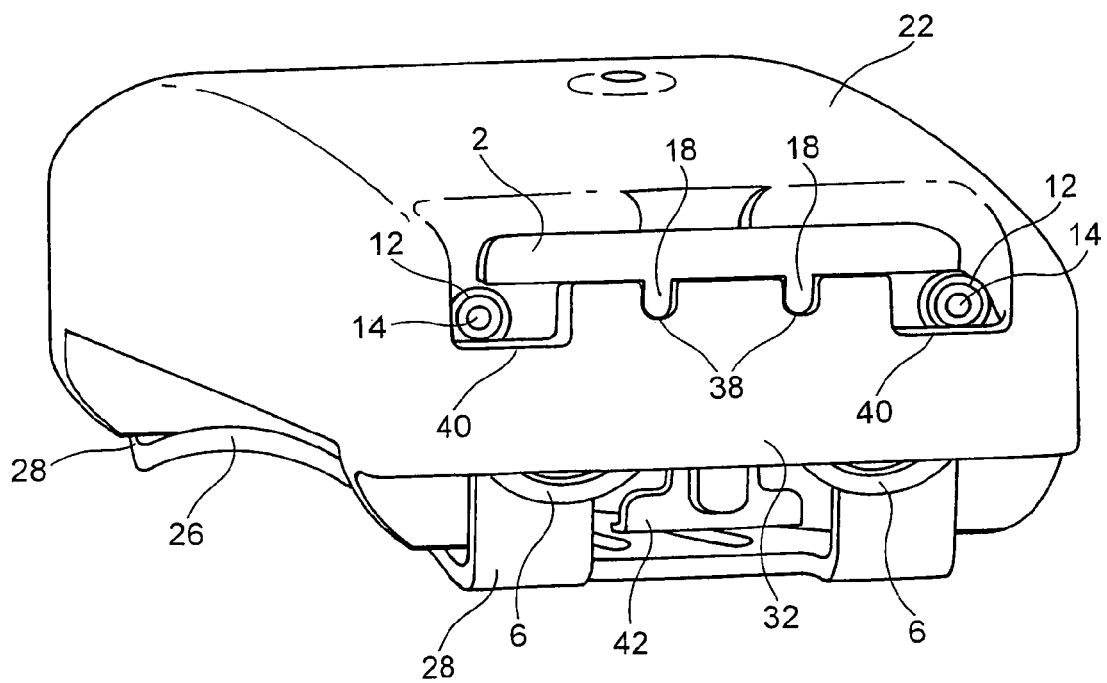

FIG. 4 shows the locking device in its position entirely inserted in the window 30. In this position, the device is immobilized, it cannot be withdrawn without a particular action. Thus, the locking device is perfectly held in the window 30. The lugs 18 in the recesses 38 prevent pursuing the movement of introduction of the locking device into the window 30 and prevent any lateral movement of the locking device during its introduction. In the opposite direction, a withdrawal of the locking device is prevented because the engagement surfaces 10 of the resilient arms 6 are in engagement in the corresponding notches 36. The device has no other degree of freedom.

It will be noted that if a force acts on the locking device tending to withdraw this latter from the window 30 in a direction opposite to its direction of introduction, the resilient arm 6 will be spaced apart and thus opposite this withdrawal. The greater this withdrawal force is, the more the resilient arms 6 oppose this withdrawal by abutment in the notches 36. Thus, in the case of an electronic housing 22 comprising a pressure sensor, disposed within a tire, when centrifugal force tends to cause the locking device to leave the window 30, the resilient arms 6 brace and prevent any withdrawal.

So as nevertheless to be able to withdraw the locking device from window 30, in the case in which it is desired for example to change the electronic housing, it is possible to act with a suitable tool on the resilient arms 6. There would then be used for example as a tool, a circlip pliers. The ends of this pliers are then introduced into the holes 14 of the ears 20 thus permitting acting on the resilient arms. The abutments 16 limit the path of the ears 12, and hence free ends of the resilient arms 6, thereby preventing any damage to the locking device. Cutouts 40 provided in the edge 32 of the window 30 permit access of the circlip pliers to the ears 12.

During the operation of mounting and dismounting a tire, large forces can be exerted on the locking device. These forces act in a direction parallel to the upper bar 2. The lugs 18 in their recess 38 take part with the rib 20 in the corresponding groove 34, to absorb the forces. Forces of the order of one ton ($10^3$ kg) can arise here.

The locking device is for example made of a synthetic material. To improve its mechanical characteristics, the synthetic material used can be reinforced with fibers, for example glass fibers or carbon fibers.

The device described above permits carrying out effective locking of the electronic housing 22 on the support 24. The locking thus effected permits resisting the strong stresses to which these pieces are subject, without however letting them come apart. The locking device described remains effective even when it is subjected to high centrifugal forces as well as during mounting/un-mounting of the corresponding tire.

The locking device provided by the invention works within its elastic region. It can be inserted and removed as desired without the risk of destruction. The manipulation of this device is also easy. Its introduction is facilitated by the guidance provided by the coaction of a rib and a groove, which also ensures correct orientation during this introduction. Un-mounting is also easy with the help of a tool (a circlip pliers for example). Access to the locking device is also easy because it is from above.

The locking device described above is completely held in its recess. Under the influence of centrifugal forces, the resilient arms spread, thereby promoting the engagement of the locking device. As indicated above, during mounting/un-mounting of the corresponding tire, the lugs coact with the corresponding recesses so as to avoid any slipping effect.

Another advantage of the locking device described above is that it can be integrated into electronic housings and supports of the prior art known to the applicant without modification of these latter.

The present invention is not limited by the embodiment described above by way of non-limiting example. It relates on the contrary to all modifications of embodiment within the skill of the art within the scope of the following claims.

The invention claimed is:

1. Locking device for a snap-in system in which a male portion of a first element coacts with a female portion of a second element, resilient means acting on the male and/or female portion of the snap-in system, characterized in that it comprises:
a transverse bar (2),
two resilient curved arms (6) whose concavity (8) is oriented toward the transverse bar (2) and which are disposed in a same plane as the transverse bar (2) such that the transverse bar (2) provides an abutment limiting the movement of the resilient arms (6) in the direction of the transverse bar (2), and
engagement means (10) disposed substantially at the free end of each resilient arm (6), complementary engagement means (36) being provided at one of the elements carrying the snap-in system.

2. Locking device according to claim 1, characterized in that the transverse bar (2) carries on the side of the resilient arms (6), for each of these latter, an abutment (16) disposed in the plane of these latter and limiting their path.

3. Locking device according to claim 1, characterized in that the free ends of the resilient arms (6) are each provided with an opening (14).

4. Locking device according to claim 1, characterized in that it comprises guide means (20) for longitudinal movement in the plane of the resilient arms (6) and perpendicular to the transverse bar (2).

5. Locking device according to claim 4, characterized in that the guide means comprise a rib (20) extending perpendicular to the transverse bar (2) between the two resilient arms (6).

6. Locking device according to claim 1, characterized in that the transverse bar (2) carries means forming an abutment (38), adapted to coact with complementary means (40) so as to prevent any movement in translation in a transverse direction in the plane containing the resilient arms (6).

7. Locking device according to claim 1, characterized in that it is made of a synthetic material loaded with fibers.

8. A snap-in system according to claim 1 in which male portion of a first element coacts with female portion of a second element, resilient means acting on the male and/or female portion of the snap-in system, characterized in that one of the elements has a window (30) and the element has a tongue (28) adapted to be introduced into the window (30) to cause the male and female portions of the snap-in system to coact, and in that said snap-in system further comprises a locking device being adapted to be disposed in the window (30) to prevent movement of the tongue (28).

9. A locking device assembly according to claim 1 comprising a pressure sensor mounted in an electronic housing (22) as well as a support (24) for said housing (22), characterized in that the electronic housing (22) and its support (24) have an engagement system with each other by snapping in.

10. Locking device according to claim 2, characterized in that the free ends of the resilient arms (6) are each provided with an opening (14).

11. Locking device according to claim 2, characterized in that it comprises guide means (20) for longitudinal movement in the plane of the resilient arms (6) and perpendicular to the transverse bar (2).

12. Locking device according to claim 3, characterized in that it comprises guide means (20) for longitudinal movement in the plane of the resilient arms (6) and perpendicular to the transverse bar (2).

13. Locking device according to claim 2, characterized in that the transverse bar (2) carries means forming an abutment (38), adapted to coact with complementary means (40) so as to prevent any movement in translation in a transverse direction in the plane containing the resilient arms (6).

14. Locking device according to claim 2, characterized in that it is made of a synthetic material loaded with fibers.

* * * * *